(12) United States Patent
Obrador

(10) Patent No.: US 8,326,029 B1
(45) Date of Patent: Dec. 4, 2012

(54) BACKGROUND COLOR DRIVEN CONTENT RETRIEVAL

(75) Inventor: Pere Obrador, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1069 days.

(21) Appl. No.: 12/263,287

(22) Filed: Oct. 31, 2008

Related U.S. Application Data

(60) Provisional application No. 61/038,708, filed on Mar. 21, 2008.

(51) Int. Cl.
*G06K 9/34* (2006.01)
*G06K 9/62* (2006.01)
(52) U.S. Cl. ........................................ 382/164; 382/224
(58) Field of Classification Search .................... 382/164
See application file for complete search history.

(56) References Cited

U.S. PATENT DOCUMENTS

| | | | |
|---|---|---|---|
| 6,661,918 B1 * | 12/2003 | Gordon et al. ................ | 382/173 |
| 6,915,011 B2 * | 7/2005 | Loui et al. .................... | 382/224 |
| 7,136,511 B2 | 11/2006 | Harrington et al. | |
| 7,260,257 B2 * | 8/2007 | Zhang et al. .................. | 382/165 |
| 7,917,518 B2 * | 3/2011 | Obrador ........................ | 707/748 |
| 2004/0076335 A1 | 4/2004 | Kim | |
| 2005/0254727 A1 | 11/2005 | Fedorovskaya | |
| 2006/0015496 A1 | 1/2006 | Keating et al. | |
| 2006/0110062 A1 | 5/2006 | Chiang et al. | |
| 2006/0257050 A1 | 11/2006 | Obrador | |
| 2007/0091106 A1 | 4/2007 | Moroney | |
| 2007/0133842 A1 | 6/2007 | Harrington | |
| 2007/0177817 A1 * | 8/2007 | Szeliski et al. ................ | 382/275 |
| 2007/0269108 A1 * | 11/2007 | Steinberg et al. ............. | 382/173 |
| 2008/0025629 A1 | 1/2008 | Obrador | |
| 2008/0025647 A1 | 1/2008 | Obrador | |

OTHER PUBLICATIONS

Obrador, P. "Automatic color scheme picker for document templates based on image analysis and dual problem," In Proc. SPIE, vol. 6076, San Jose, CA, 2006.*
Markkula, M.and Sormunen, E., "End-user searching challenges Indexing practices in the digital newspaper photo archive." Information retrieval, 1:259-285, 2000.
Martinet, J., Chiaramella, Y. and Mulhem, P. "A model for weighting image objects in home photographs." In ACM CIKM'05, pp. 760-767, Bremen, Germany, 2005.
Obrador, P. "Automatic color scheme picker for document templates based on image analysis and dual problem," In Proc. SPIE. vol. 6076, San Jose, CA, 2006.
Obrador, P., "Content Selection based on Compositional Image Quality" In Proc. SPIE, vol, 6500, San Jose, CA 2007.
Savakis, A., Etz, S., and Loui A., "Evaluation of image appeal in consumer photography," In Proc. SPIE vol. 3959, 2000.
Smith, R. J. and Chang, S.-F. "Integrated Spatial and Feature Image Query, Multimedia Systems, 7(2):129-140. 1999."
M. Cadik et al., "Image attributes and quality for evaluation of tone mapping operators," In Proc. Pacic Graphics 2006, p. 35-44, National Taiwan U. Press, Taipei, Taiwan 2006.

(Continued)

*Primary Examiner* — David Zarka

(57) ABSTRACT

A respective model of background color is determined for each image in a set of images. For each of the images, a respective background sub-image is extracted from the image, the background sub-image is segmented into regions, and each of the regions is labeled with a respective color label. An image query is generated from a target color template. For each of the images, a respective score is calculated from the image query and the respective color model. At least one of the images is retrieved from an image collection based on the respective scores.

19 Claims, 8 Drawing Sheets

OTHER PUBLICATIONS

H. Balinsky, "Evaluating interface aesthetics: a measure of symmetry", Digital Publishing Conference/IS & T/SPIE Int'l Symp. on Electronic Imaging, Jan. 2006, San Jose, CA USA.

S.J Harrington, J.F. Naveda, R.P. Jones, P. Roetling and N. Thakkar, "Aestheticmeasures for automated document layout", ACM Symposium on document engineering, 2004.

P. Obrador, "Multiresolution Color Patch Extraction", Electronic Imaging, VCIP Jan. 18, 2006, San Jose, CA USA.

H. Li and K.N. Ngan, "Unsupervised segmentation of defocused video based on matting modal", ICIP 2006, Atlanta.

R. Ferzli and L. J. Karam, "A Human Visual System-Based Model for Blur/Sharpness Perception," 2nd Int'l Wkshop Vid. Process. and Quat. Metrics for Consumer Electr., Jan. 2006.

Shaked, D. and Tastl, I. , "Sharpness measure: towards automatic image enhancement", ICIP 2005. Sep. 11-14, 2005, vol. 1, on pp. I-937-I-940.

L. Itti, C. Koch, E. Niebur, "A model of saliency-based visual attention for rapid scene analysis", IEEE trans. on pat. analysis and mach. intel., (20)11:1254-1259 (1998).

Chao, H., Fan, J., "Layout and Content Extraction for PDF Documents" In proceeding of IAPR Int. workshop on Document Analysis System, 2004.

H. de Ridder et al., "Naturalness and image quality: chroma and hue variation in color images of natural scenes", Proceedings of SPIE 2411, 51-61 (1995).

Bajcsy, R. "Active Perception", Proceedings of the IEEE, vol. 76, No. 8, pp. 996-1005, 1988.

Corridoni et al., "Querying and retreiving pictorial data using semantics Induced by colour quality and arrangement," Proc. Multimedia, 1996.

Vasile, A., Bender, W.R. Image query based on color harmony, in Proc. SPIE vol. 4299, San Jose, CA, 2001.

G. M. Johnson and M. D. Fairchild, "Measuring images: Differences, Quality, and Appearance," Proc SPIE/IS&T Electronic Imaging Conference, Santa Clara, 5007, 51-60 (2003).

"CopySpace(TM)—How it works," iStock International, http://www.istockphoto.com/copyspace_guide.php (downloaded Jul. 13, 2007).

Li-Qun Chen et al., "A visual attention model for adapting images on small displays," ACM Multimedia Systems Journal, 9(4):353-364, Nov. 2003.

Bringier et al., "No-reference perceptual quality assessment of colour image," EUSIPCO 2006, Florence, Italy (Sep. 4-8, 2006).

Oge Marques et al., "An attention-driven model for grouping similar images with image retrieval applications," EURASIP J. Adv. Sig Proc., v2007.

N. Burningham et al., "Image Quality Metrics," Processing, Image Quality, Image Capture Systems Conference (2003).

Changick Kim et al., "Fast Extraction of Objects of Interest from Images with Low Depth of Field," ETRI Journal, vol. 29, No. 3, pp. 353-362, Jun. 2007.

Jia Li et al., "Multiresolution Object-of-Interest Detection for Images with Low Depth of Field," iciap, p. 32, 10th Int'l Conf Image Analysis and Proc (ICIAP'99), 1999.

Srihari, R.; Zhongfei Zhang; Aibing Rao, Content-Based Access of Image and Video Libraries, 1999. (CBAIVL '99) Proceedings. IEEE Workshop on Jun. 22, 1999 pp. 97-101.

Viola and Jones, "Robust Real-Time Object Detection," Second International Workshop of Statistical and Computation theories of Vision—Modeling, Learning, Computing, and Sampling, Vancouver, Canada (Jul. 13, 2001).

Rowley et al., "Neural Network-Based Face Detection," IEEE Transactions on Pattern Analysis and Machine Intelligence, vol. 20, No. 1 (Jan. 1998).

* cited by examiner

BACKGROUND COLOR DRIVEN CONTENT RETRIEVAL

CROSS-REFERENCE TO RELATED APPLICATIONS

This patent application claims the benefit of priority under 35 U.S.C. §119(e) to U.S. Provisional patent application Ser. No. 61/038,708, filed Mar. 21, 2008, entitled "Background Color Driven Content Retrieval," having the same inventors and which is hereby incorporated by reference in its entirety.

This application relates to the following co-pending applications, each of which is incorporated herein by reference:

U.S. patent application Ser. No. 11/496,146, filed Jul. 31, 2006;

U.S. patent application Ser. No. 11/495,846, filed Jul. 27, 2006;

U.S. patent application Ser. No. 11/495,847, filed Jul. 27, 2006;

U.S. patent application Ser. No. 11/127,278, filed May 12, 2005;

U.S. patent application Ser. No. 11/259,597, filed Oct. 25, 2005;

U.S. patent application Ser. No. 11/781,178, filed Jul. 20, 2007;

U.S. patent application Ser. No. 11/495,847, filed Jul. 27, 2006; and

U.S. patent application Ser. No. 11/495,846, filed Jul. 27, 2006.

BACKGROUND

Individuals and organizations are rapidly accumulating large collections of digital content, including text, audio, graphics, animated graphics and full-motion video. This content may be presented individually or combined in a wide variety of different forms, including documents, presentations, still photographs, commercial videos, home movies, and metadata describing one or more associated digital content files. As these collections grow in number and diversity, individuals and organizations increasingly will require systems and methods for retrieving the digital content from their collections.

Among the ways that commonly are used to retrieve digital content from a collection are browsing methods and text-based retrieval methods. Browsing methods involve manually scanning through the content in the collection. Browsing, however, tends to be an inefficient way to retrieve content and typically is useful only for small content collections. Text-based retrieval methods involve submitting queries to a text-based search engine that matches the query terms to textual metadata that is associated with the content. Text-based retrieval methods typically rely on the association of manual annotations to the content, which requires a significant amount of manual time and effort.

Content-based retrieval methods also have been developed for retrieving content based on the actual attributes of the content. Content-based retrieval methods involve submitting a description of the desired content to a content-based search engine, which translates the description into a query and matches the query to one or more parameters that are associated with the content. Some content-based retrieval systems support query-by-text, to which involves matching query terms to descriptive textual metadata associated with the content. Other content-based retrieval systems additionally support query-by-content, which involves interpreting a query that describes the content in terms of attributes such as color, shape, and texture, abstractions such as objects, roles, and scenes, and subjective impressions, emotions, and meanings that are assigned to the content attributes. In some content-based image retrieval approaches, low level visual features are used to group images into meaningful categories that, in turn, are used to generate indices for a database containing the images. Exemplary low level features include texture, shape, and layout. The parameters (or terms) of an image query may be used to retrieve images in the databases that have indices that match the conditions in the image query. In general, the results of automatic categorization and indexing of images improve when the features that are used to categorize and index images accurately capture the features that are of interest to the person submitting the image queries.

A primary challenge in the design of a content-based retrieval system involves identifying meaningful attributes that can be extracted from the content and used to rank the content in accordance with the degree of relevance to a particular retrieval objective.

SUMMARY

In one aspect, the invention features a method in accordance with which a respective model of background color is determined for each image in a set of images. For each of the images, a respective background sub-image is extracted from the image, the background sub-image is segmented into regions, and each of the regions is labeled with a respective color label. An image query is generated from a target color template. For each of the images, a respective score is calculated from the image query and the respective color model. At least one of the images is retrieved from an image collection based on the respective scores.

The invention also features apparatus and a machine readable medium storing machine-readable instructions causing a machine to implement the method described above.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. Introduction

The embodiments that are described in detail herein are capable of retrieving images (e.g., digital photographs, video frames, scanned documents, and other image-based graphic objects including mixed content objects) based on background image color criteria. In some of these embodiments, images are indexed in accordance with models of their respective distributions of background color. Images are retrieved based on comparisons of their associated color based indices with the parameters of the background color driven image queries. These embodiments enable the retrieval of images captured at similar events and locations with reduced sensitivity to changes in the colors and the color distributions of transient foreground objects, thereby improving the retrieval results.

II. Definition of Terms

The term "image forming element" refers to an addressable region of an image. In some embodiments, the image forming elements correspond to pixels, which are the smallest addressable units of an image. Each image forming element has at least one respective value that is represented by one or more bits. For example, an image forming element in the RGB color space includes a respective value for each of the colors red, green, and blue, where each of the values may be represented by one or more bits.

A "computer" is a machine that processes data according to machine-readable instructions (e.g., software) that are stored on a machine-readable medium either temporarily or permanently. A set of such instructions that performs a particular task is referred to as a program or software program.

The term "machine-readable medium" refers to any medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

III. Overview

Figure 1:
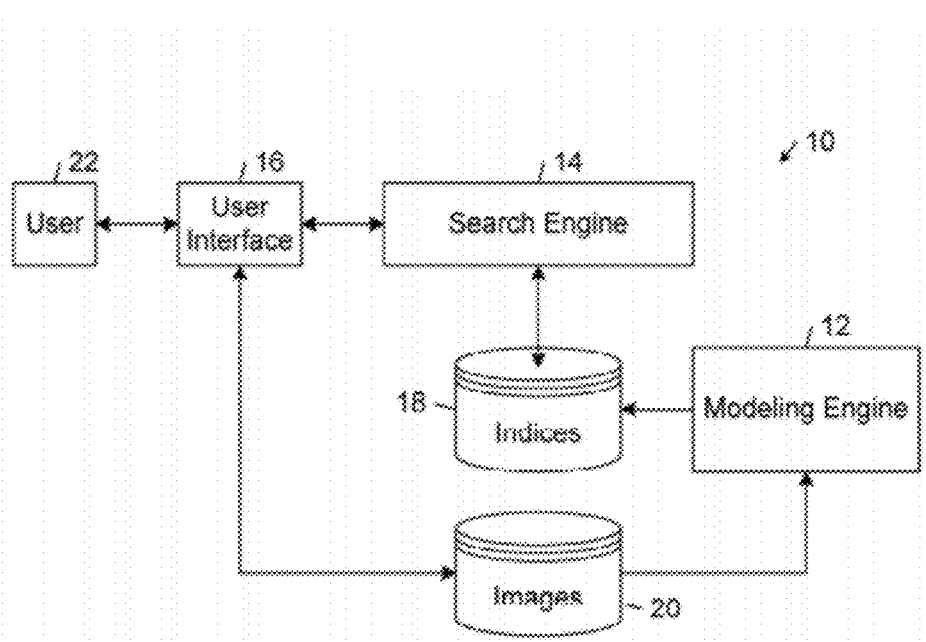
FIG. 1 is a block diagram of an embodiment of a background color driven content retrieval system.

FIG. 1 shows an embodiment of a background color driven content retrieval system 10 that includes a modeling engine 12, a search engine 14, and a user interface 16. The modeling engine 12 builds a respective index 18 for each of the images 20 in a collection. Each of the indices 18 typically is a pointer to a respective one of the images 20. The search engine 14 receives search parameters from the user interface 16, constructs image queries from the received parameters, compares the image queries to the indices 18, and returns to the user interface 16 ones of the indices 18 that are determined to match the image queries. The user interface 16 allows a user 22 to interactively specify search parameters to the search engine 14, browse the search results (e.g., thumbnail versions of the matching images), and view ones of the images that are associated to the matching indices returned by the search engine 12.

As used herein, a "collection" refers to a set of images. In some cases, the images in a collection are related to one another either by being stored in the same location or by being indexed in the same database. In other cases, the images in a collection are not related in such ways. In general, the images 20 may be stored in one or more local or remote computer-readable media, and the images may or may not be indexed in one or more image databases.

Figure 2:
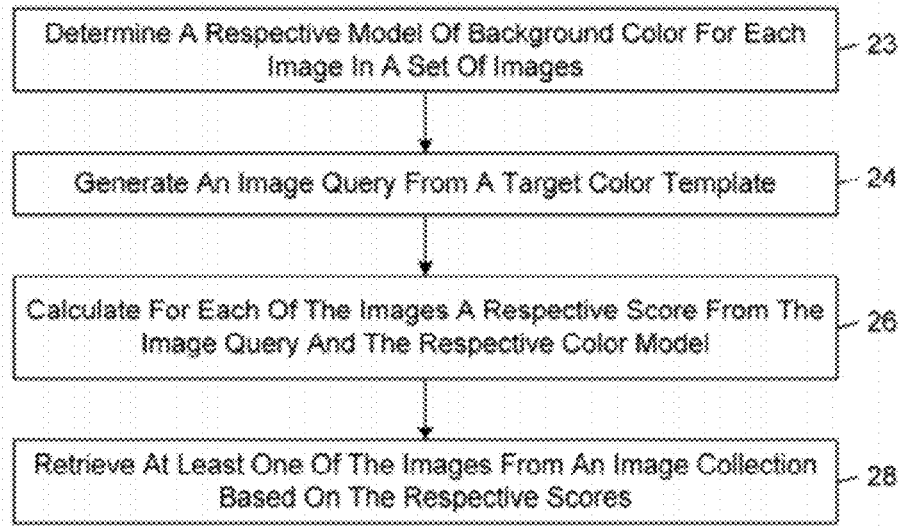
FIG. 2 is a flow diagram of an embodiment of a background color driven content retrieval method.

FIG. 2 shows an embodiment of a background color driven content retrieval method that is implemented by the background color driven content retrieval system 10 to enable a background color driven content retrieval of images from the one or more local or remote computer-readable media.

The modeling engine 12 determines for each of the images 20 a respective model of background color in the image (FIG. 2, block 23). In this process, the modeling engine 12 extracts a background sub-image from each image 20, determines features (or attributes) of each background sub-image, and constructs the respective background color model from the extracted features. The modeling engine 12 creates for each of the images 20 a respective index 18 from parameters of the respective background color model and associates the respective index to the corresponding image. The modeling engine 12 may store the indices 18 in a database that is separate from the images (as shown in FIG. 1) or it may store the indices with metadata that is associated with corresponding ones of the images 20. The modeling engine 12 typically performs the background color modeling of the images 20 in an offline process.

The search engine 14 generates an image query from a target color template (FIG. 2, block 24). In some embodiments, the background color driven content retrieval system 10 receives from the user interface 16 a direct specification by the user 22 of the target color template for the images to be retrieved by the system 10. In other embodiments, the background color driven content retrieval system 10 infers the target color template automatically from an analysis of a document being constructed by the user.

The background color driven content retrieval system 10 calculates for each of the images a respective score from the image query and the respective color model (FIG. 3, block 26) and retrieves at least one of the images from an image collection based on the respective scores (FIG. 2, block 28). In this process, the search engine 14 compares the image query to the indices 18 and returns to the user interface 16 one or more of the indices 18 that are determined to match the image queries. The search engine 14 ranks the indices 18 based on a scoring function that produces values indicative of the level of match between the image query and the respective indices 18, which define the respective models of background color in the images 20. The user 22 may request the retrieval of one or more of the images 20 associated to the results returned by the search engine 14. In response, the user interface 16 (or some other application) retrieves the requested images from the one or more local or remote image databases. The user interface 16 typically queries the one or more databases using the indices returned by the search engine 14 that correspond to the one or more images requested by the user 22.

IV. Determining a Model of Background Color in an Image

A. Overview

Figure 3:
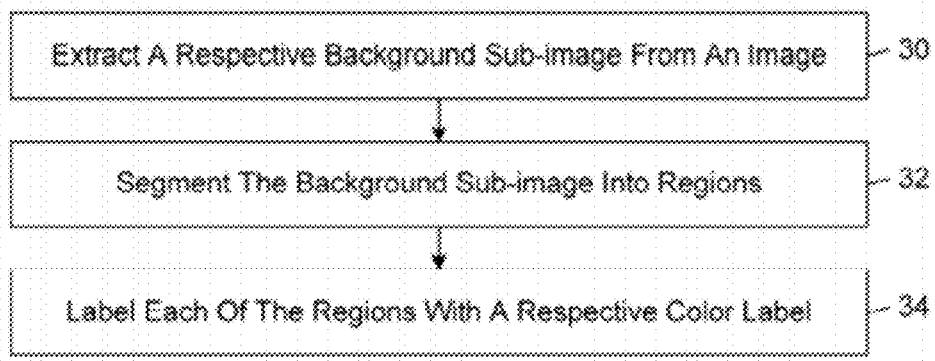
FIG. 3 is a flow diagram of an embodiment of a method of determining a model of background color for an image.

FIG. 3 shows an embodiment of a method by which the modeling engine 12 determines a model of background color for an image. In accordance with this method, the modeling engine 12 extracts a background sub-image from the image (FIG. 3, block 30). The modeling engine 12 segments the background sub-image into regions (FIG. 3, block 32). The modeling engine 12 labels each of the regions with a respective color label (FIG. 3, block 34). Each of these processes if described in detail below in the following sections.

B. Extracting a Background Sub-Image

1. Introduction

As explained above, the modeling engine 12 extracts a background sub-image from each of the image 20 (FIG. 3, block 30). The modeling engine 12 may extract a background sub-image from each of the images 20 in accordance with any of a variety of different background segmentation methods, including but not limited to thresholding and region growing.

Thresholding involves classifying pixels based on their respective grayscale or color values, where pixels with values below a threshold are classified into a first group and pixels with values above the threshold are classified into a second group. In some thresholding approaches a single, global threshold is used to segment pixels into the first and second groups. In other, so-called "adaptive thresholding" approaches, local thresholds are computed based on the characteristics of respective sub-regions of an image and the computed local thresholds are used to classify pixels in the corresponding image sub-regions.

Region growing is an image segmentation process that merges pixels into regions based on predefined criteria. Region growing processes typically begin with the identification of one or more "seed" regions each containing one or more seed pixels. Pixels that have characteristics similar to adjacent seed regions are merged into the adjacent seed regions in accordance with the predefined criteria. In one region growing approach, pixels are merged into adjacent seed regions when certain features of the pixels, such as color or texture, are similar enough to the adjacent seed regions to satisfy a prescribed local or global similarity constraint. The similarity constraint typically is implemented by computing measures of distances between pixels and the seed regions, and comparing the distance measures to corresponding thresholds. The similarity constraint implementation may involve the use of a single global threshold that is used to merge pixels into the seed regions. Alternatively, the similarity constraint implementation may involve the use of adaptive thresholds that are computed for particular sub-regions of a given image based on the characteristics of the sub-regions.

Figure 4:
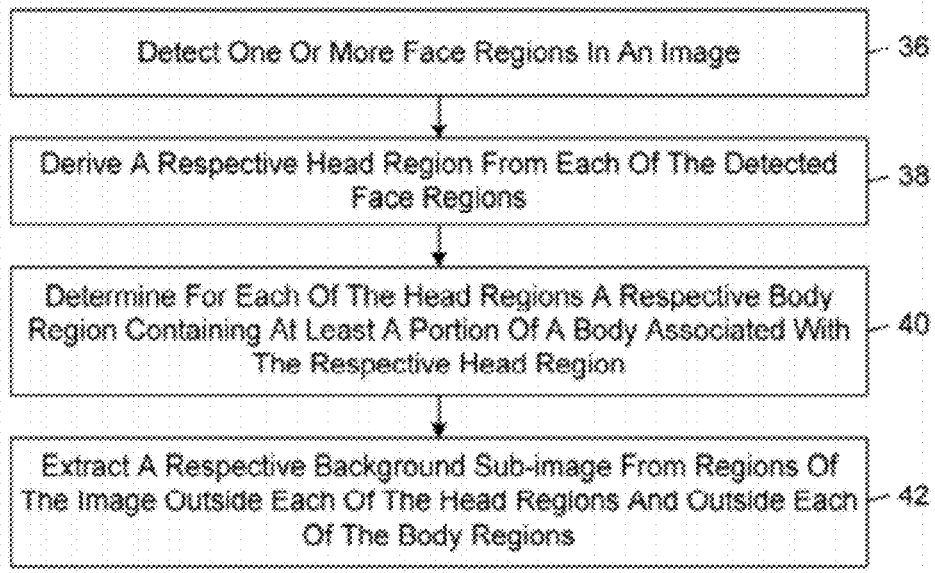
FIG. 4 is a flow diagram of an embodiment of a face-based method of extracting a background sub-image from an image.

In the embodiments described in detail below, the modeling engine 12 extracts a background sub-image from the image using one or both of a face-based background segmentation method and a focus-based background segmentation method. In these embodiments, the modeling engine 12 determines one or more respective foreground object regions in each of the images and then extracts the respective background sub-image from regions of the image outside each of the foreground object regions 2. Face-Based Background Segmentation FIG. 4 shows an embodiment of a face-based method by which the modeling engine 12 extracts a background sub-image from each of the images 20. In accordance with this method, modeling engine 12 detects one or more face regions in an image (FIG. 4, block 36). The modeling engine 12 derives a respective head region from each of the detected face regions (FIG. 4, block 38). The modeling engine 12 determines for each of the head regions a respective body region containing at least a portion of a body associated with the respective head region (FIG. 4, block 40). The modeling engine 12 then extracts a respective background sub-image from regions the image outside each of the head regions and outside each of the body regions (FIG. 4, block 42). In the embodiment of FIG. 4, each head region and its associated body region constitutes a respective foreground object region.

The modeling engine 12 may detect faces in the input images 20 (FIG. 4, block 36) using any type of face detection process that determines the presence and location of each face in the input images 20. Exemplary face detection methods include but are not limited to feature-based face detection methods, template-matching face detection methods, neural-network-based face detection methods, and image-based face detection methods that train machine systems on a collection of labeled face samples. An exemplary feature-based face detection approach is described in Viola and Jones, "Robust Real-Time Object Detection," Second International Workshop of Statistical and Computation theories of Vision—Modeling, Learning, Computing, and Sampling, Vancouver, Canada (Jul. 13, 2001), which is incorporated herein by reference. An exemplary neural-network-based face detection method is described in Rowley et al., "Neural Network-Based Face Detection," IEEE Transactions on Pattern Analysis and Machine Intelligence, Vol. 20, No. 1 (January 1998), which is incorporated herein by reference.

In a typical face detection process, the modeling engine 12 determines the presence and location of each face in each of the input images 20. For each detected face, the modeling engine 12 determines a respective facial bounding box that delimits a face region of the image containing the detected face. The modeling engine 12 typically determines the locations (e.g., the coordinates of the upper left corner and the bottom right corner) of each of the facial bounding boxes. In some implementations, each facial bounding box corresponds to a rectangle that includes the eyes, nose, mouth but not the entire forehead or chin or top of head of a detected face.

Figure 5A:
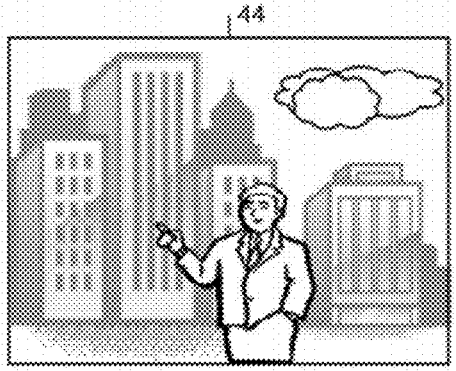
FIG. 5A is a diagrammatic view of an exemplary image.
Figure 5B:
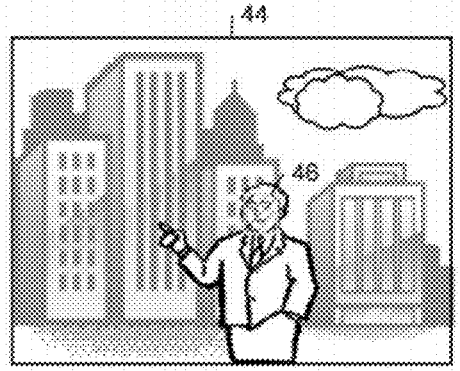
FIG. 5B is a diagrammatic view of a face region boundary superimposed over the exemplary image shown in FIG. 5A.

FIG. 5A shows an exemplary image 44 and FIG. 5B shows an embodiment of a detected face region boundary 46 that is superimposed over the exemplary image 44.

After determining the sizes and locations of each of the face region (FIG. 4, block 36), the modeling engine 12 derives a respective head region from each of the detected face regions (FIG. 4, block 38). In this process, the modeling engine 12 outwardly extends one or more of the sides of each of the facial bounding boxes to produce a respective head boundary box that delimits a respective head region, which encompasses the corresponding face region. The amounts by which the one or more sides of the facial bounding boxes are extended typically is determined empirically based on the objective of capturing within the head bounding box regions of the person's head which may be merged with the background portions of the image. In some embodiments, the extension amounts of the sides of a facial bounding box are functions of the dimensions of the corresponding facial bounding box. For example, in some of these embodiments, a head boundary box is produced by outwardly extending the top side of the corresponding facial bounding box by a fixed fraction of the vertical height of the facial bounding box and outwardly extending the left and right sides of the facial bounding box by equal amounts corresponding to a respective fixed fraction of the horizontal width of the facial bounding box.

Figure 5C:
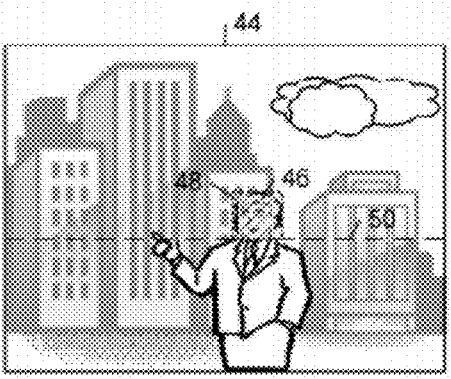
FIG. 5C is a diagrammatic view of a foreground object region boundary that is encompasses a head region boundary and a body region boundary, which are superimposed over the exemplary image shown in FIG. 5A.

FIG. 5C shows an exemplary head region boundary box 48 that is produced by outwardly extending the top side, the left side, and the right side of the face region boundary box 46 by respective empirically determined amounts.

The modeling engine 12 may determine a respective body region for each of the head regions (FIG. 4, block 40) in a variety of different ways.

Figure 5D:
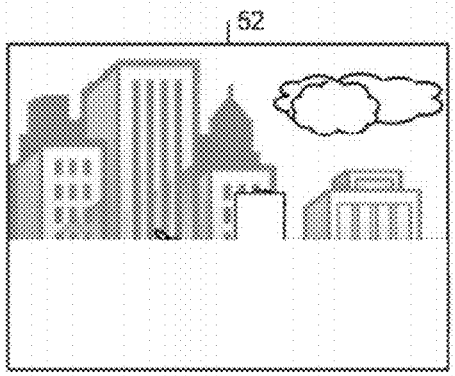
FIG. 5D is a diagrammatic view of a background sub-image that was extracted from the exemplary image shown in FIG. 5C.

In some embodiments, the modeling engine 12 determines each body region based on the corresponding head boundary box. In these embodiments, the modeling engine 12 designates the body region as the entire region of the image below the bottom border of the corresponding head boundary box. FIG. 5C shows an exemplary body region boundary 50 that is superimposed over the exemplary image 44. FIG. 5D shows a background sub-image 52 that was extracted from the exemplary image 44. In this embodiment, the background sub-image 52 corresponds to all of the regions of the image 44 outside the foreground object region composed of the head region 48 and outside of the body region 50 (see FIG. 5C).

In other embodiments, the modeling engine 12 may determine for each of the detected face regions a respective foreground object region that surrounds the corresponding face region. In some of these embodiments, the height ($h_{FO}$) and width ($w_{FO}$) of the foreground object region are functions of the corresponding dimensions ($h_{face}$, $w_{face}$) of the associated face region. For example, in some of these embodiments, the dimensions of the foreground object region are given by:

$$h_{FO} = k_{height} \cdot h_{face} \quad (1)$$

$$w_{FO} = k_{width} \cdot w_{face} \quad (2)$$

where $k_{height}$ and $k_{width}$ are scalar constants, which may be determined empirically. In these embodiments, the location of the top side of the foreground object region is located above the top side of the associated face region by a distance that is equal to the distance between the top side of the face region and the vertical (i.e., along the height dimension) location of the eyes. In this embodiment, the left and right sides of the foreground object region are located symmetrically with respect to the left and right sides of the face region.

Figures 6A, 6B:
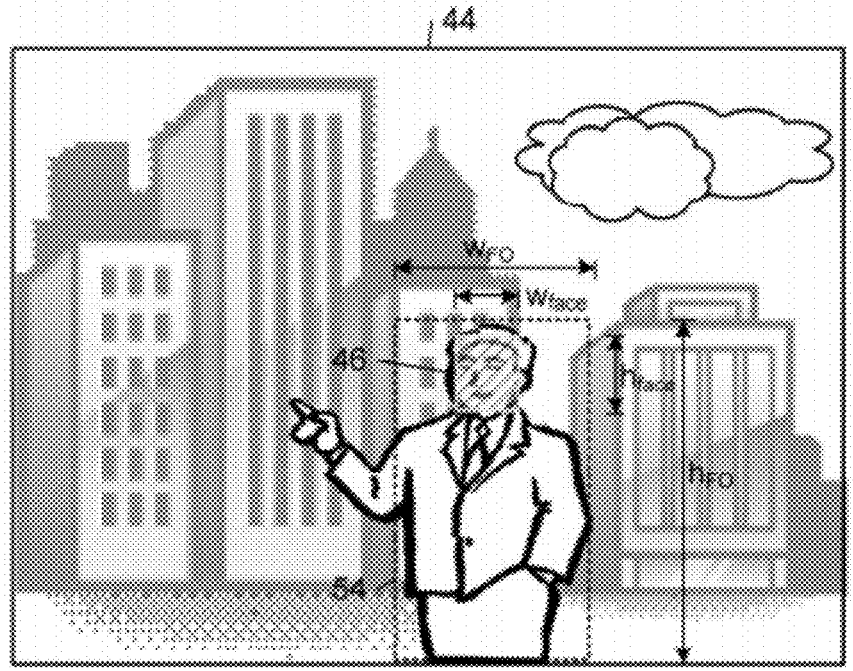
FIG. 6A is a diagrammatic view of a foreground object region boundary and a face region boundary superimposed over the exemplary image shown in FIG. 5A.
FIG. 6B is a diagrammatic view of a background sub-image that was extracted from the exemplary image shown in FIG. 6B.

FIG. 6A shows an exemplary foreground object region boundary box 54 that is produced from the face region boundary box 46 in accordance with equations (1) and (2). FIG. 6B shows a background sub-image 56 that was extracted from the exemplary image 44. In this embodiment, the background sub-image 56 corresponds to all of the regions of the image 44 outside of the foreground object region 54 (see FIG. 6B).

3. Focus-Based Background Segmentation

Figure 7:
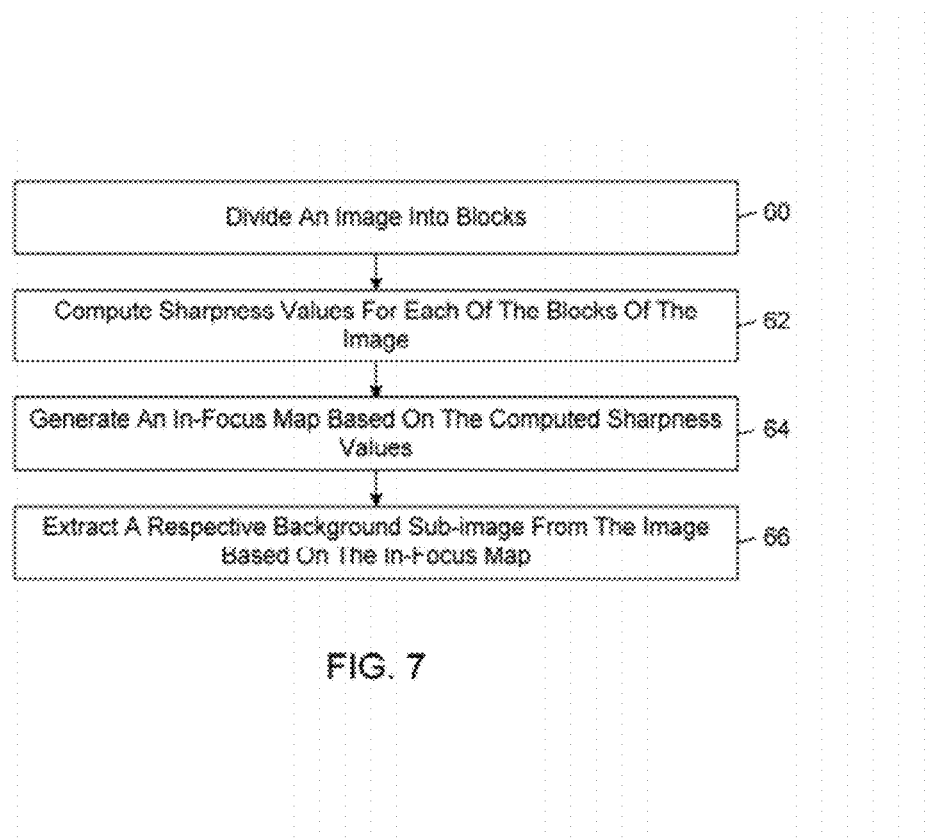
FIG. 7 is a flow diagram of an embodiment of a focus-based method of extracting a background sub-image from an image.

FIG. 7 shows an embodiment of a focus-based method by which the modeling engine 12 extracts a background sub-image from each of the images 20. In accordance with this method, modeling engine 12 divides an image into blocks (FIG. 7, block 60). The modeling engine 12 computes sharpness values for each of the blocks of the image (FIG. 8, block 62). The modeling engine 12 generates an in-focus map based on the computed sharpness values (FIG. 7, block 64). The modeling engine 12 extracts a respective background sub-image from the image based on the in-focus map (FIG. 7, block 66).

In some embodiments, the modeling engine 12 determines the background sub-image from estimates of local sharpness that correspond to an average ratio between the high-pass and low-pass energy of the one-dimensional intensity gradient in the block (i.e., local regions) of the image. In accordance with this embodiment, each image 20 is divided into blocks of, for example, 100×100 pixels. The intensity gradient is computed for each horizontal pixel line and vertical pixel column within each block. For each horizontal and vertical pixel direction in which the gradient exceeds a gradient threshold, the modeling engine 12 computes a respective measure of local sharpness from the ratio of the high-pass energy and the low-pass energy of the gradient. A sharpness value is computed for each block by averaging the sharpness values of all the lines and columns within the block. The blocks with values in a specified percentile (e.g., the upper seventieth percentile) of the distribution of the sharpness values are assigned to the in-focus map.

In some embodiments, an optional connectivity analysis is performed on the in-focus map in order to correct possible misclassifications. In this process, pixels are grouped together based on their assigned classification labels (i.e., "in-focus" and "not in-focus") and their mutual spatial proximity. Any one of a wide variety of different pixel connectivity processes may be applied to the in-focus map. For example, in one connected component labeling approach, the image is converted into a binary image based on the in-focus map. For example, the image pixels that are classified as not in-focus (i.e., background pixels) are labeled with "1" and the pixels that are classified as in-focus (i.e., foreground object pixels) are labeled with "0". The resulting binary image is examined, pixel-by-pixel in order to identify connected pixel regions (or "blobs", which are regions of adjacent pixels that are as assigned the same label). For each given pixel, the label assigned to the given pixel is compared to the labels assigned to the neighboring pixels. The label assigned to the given pixel is changed or unchanged based on the labels assigned to the neighboring pixels. The number of neighbors examined and the rules for determining whether to keep the originally assigned label or to re-classify the given pixel depends on the measure of connectivity being used (e.g., 4-connectivity or 8-connectivity).

The modeling engine 12 extracts the regions of the image outside of the foreground object regions as the background sub-image.

4. Combined Face-Based and Focus-Based Background Segmentation

In some embodiments the results of a face-based background segmentation process and a focus-based background segmentation process are combined to determine a respective background sub-image from each of the images 20. In these embodiments, the modeling engine 12 merges all the foreground object regions that are determined using both methods into a merged foreground sub-image. The modeling engine 12 then extracts the regions of the image outside of the merged foreground sub-image to produce the background sub-image.

Figure 8A:
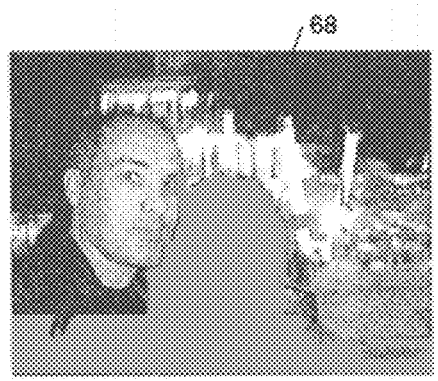
FIG. 8A is a diagrammatic view of a background sub-image that was extracted from an exemplary image in accordance with an embodiment of a face-based background sub-image segmentation method.
Figure 8B:
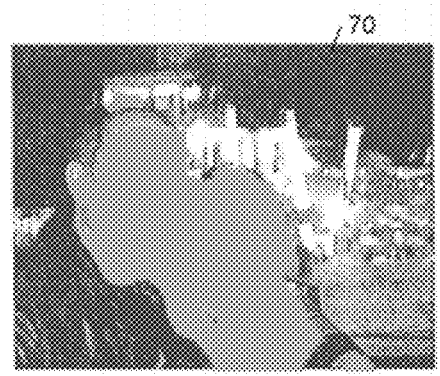
FIG. 8B is a diagrammatic view of a background sub-image that was extracted from an exemplary image in accordance with an embodiment of a focus-based background sub-image segmentation method.
Figure 8C:
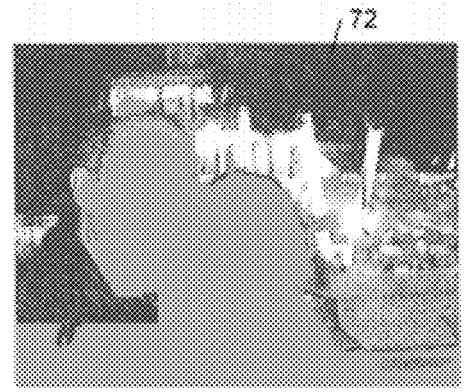
FIG. 8C is a diagrammatic view of a background sub-image that was extracted from an exemplary image in accordance with an embodiment of a face-based background sub-image segmentation method and an embodiment of a focus-based background sub-image segmentation method.

FIG. 8A shows a background sub-image 68 that was extracted from an exemplary image in accordance with an embodiment of a face-based background sub-image segmentation method. FIG. 8B shows a background sub-image 70 that was extracted from an exemplary image in accordance with an embodiment of a focus-based background sub-image segmentation method. FIG. 8C shows a background sub-image 72 that was extracted from an exemplary image based on a merged foreground sub-image produced by merging the foreground sub-regions determined using both (i) the face-based background segmentation method used to produce the background sub-image 68 (see FIG. 8A) and (ii) the focus-based background segmentation method used to produce the background sub-image 70 (sec FIG. 8B).

C. Determining a Model of Background Color from an Extracted Background Sub-Image 1. Segmenting the Background Sub-Image into Regions After extracting a respective background sub-image from an image (FIG. 3, block 32), the modeling engine 12 determines a model of background color from the extracted sub-image. In this process, the modeling engine 12 segments the background sub-image into regions (FIG. 3, block 32), and labels each of the regions with a respective color label (FIG. 3, block 34).

Figure 9:
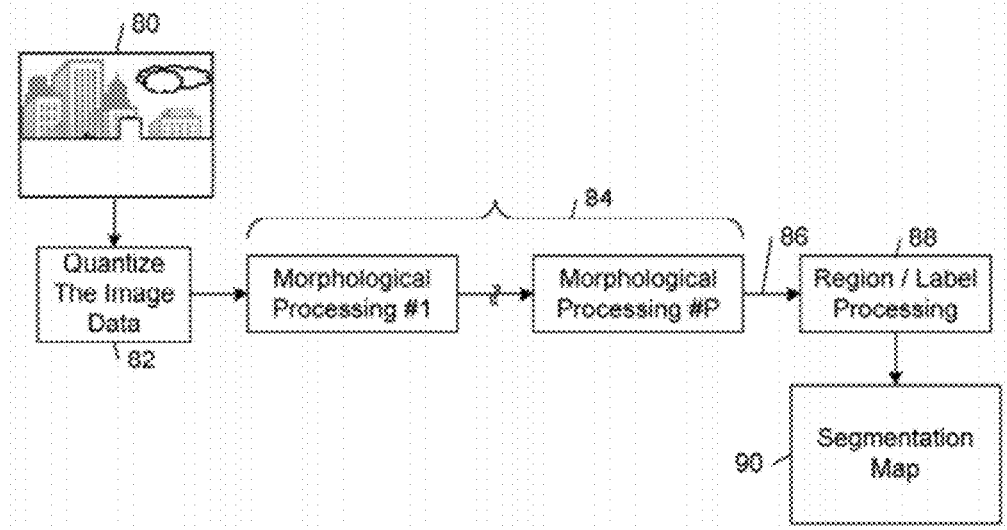
FIG. 9 is a flow diagram of an embodiment of a method of segmenting a background sub-image to produce a segmentation map.

FIG. 9 shows an embodiment of a method of segmenting a background sub-image (e.g., background sub-image 52 shown in FIG. 5D) that involves extracting color patches from the background sub-image in a way that maintains edges and detail regions.

In accordance with the method of FIG. 9, the modeling engine 12 accesses image data of the background sub-image being processed (FIG. 9, block 80). In some embodiments, the image data are the color values (e.g., RGB values) of image forming elements (e.g., pixels) in the background sub-image. In some embodiments, the modeling engine 12 may convert the image data to a desired color space (e.g., the CIE-Lab color space) before proceeding to the next processing stage.

The modeling engine 12 quantizes the image data (FIG. 9, block 82). In this process, the background sub-image is quantized in accordance with a quantization table (or color palette). In one embodiment, lexical quantization is performed, for example, using one or more of the lexical quantization methods described in U.S. patent application Ser. No. 11/259,597, filed Oct. 25, 2005. In this process, individual image forming elements of the background sub-image are associated with one of a plurality of lexical color names. Lexical quantization allows for a discrete outcome permitting filtering of non-consistent colors within a color patch or region. The result of the quantization process is a set of sparsely quantized images.

The modeling engine 12 performs color morphological processing of the quantized image data (FIG. 9, stage 84). This process may include P levels of morphological processing (filtering) at different resolutions, where P has a positive integer value greater than zero. The output 86 of the morphological processing stage 84 identifies a plurality of regions of the background sub-image. The constituent image forming elements in each of these regions have a common characteristic, such as a consistent color corresponding to one of the lexical color names in the quantization table.

The modeling engine 12 performs region/label processing of the background sub-image based on the output 86 of the morphological processing stage 84 (FIG. 9, block 88). In the course of the region/label processing, the regions are labeled using lexical color names according to the consistent colors of the respective regions. In addition, some of the regions that are identified by the morphological processing of step 84 may be merged. For example, regions are merged if the modeling engine 12 determines that the regions correspond to a single portion or object of the background sub-image (e.g., due to a color gradient occurring in the portion or object causing the lexical quantization of the portion or object to be classified into plural regions). After the region/label processing, the modeling engine 12 outputs a segmentation map 90, which is used by the modeling engine 12 to produce the model of background color for the corresponding image, as explained in detail below.

Additional details regarding the operation and various implementations of the color-based segmentation method of FIG. 9 are described in the following references, each of which is incorporated herein by reference: U.S. patent application Ser. No. 11/495,846, filed Jul. 27, 2006; U.S. patent application Ser. No. 11/495,847, Jul. 27, 2006; U.S. patent application Ser. No. 11/259,597, filed Oct. 25, 2005; Pere Obrador, "Multiresolution Color Patch Extraction," SPIE Visual Communications and Image Processing, San Jose, Calif., USA, pp. 15-19 (January 2006); and Pere Obrador, "Automatic color scheme picker for document templates based on image analysis and dual problem," in Proc. SPIE, vol. 6076, San Jose, Calif. (January 2006).

Figure 10:
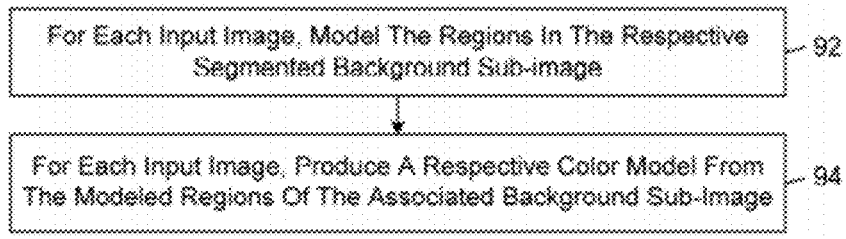
FIG. 10 is a flow diagram of an embodiment of a method of producing a model of color for an image based on a segmented background sub-image extracted from the image.

2. Determining a Model of Background Color for each Image from the Segmented Regions of the Background Sub-Image FIG. 10 shows an embodiment of a method of producing a model of color for each of the images 20 from its respective background sub-image. In accordance with this method, for each of the input images 20, the modeling engine 12 models the regions in the respective segmented background sub-image (FIG. 10, block 92). For each of the input images 20, the modeling engine 12 produces a respective color model from the modeled regions of the associated background sub-image (FIG. 10, block 94).

Figure 11:
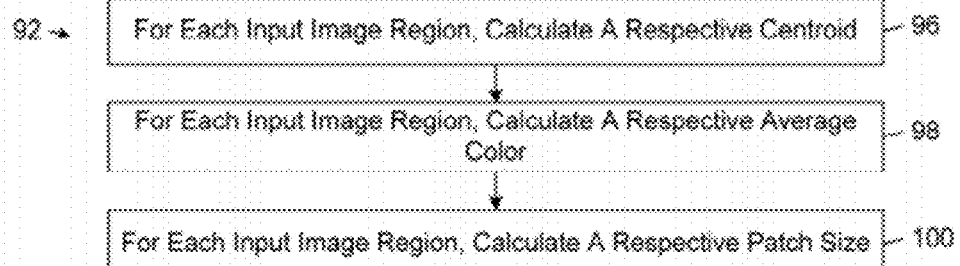
FIG. 11 is a flow diagram of an embodiment of a method modeling the regions into which a background sub-image is segmented

FIG. 11 shows an embodiment of a method by which the modeling engine 12 models the regions into which the background sub-image is segmented (FIG. 10, block 92). In accordance with this method, the modeling engine 12 calculates for each region a respective centroid (FIG. 11, block 96), a respective average color (FIG. 11, block 98), and a respective patch size (FIG. 11, block 100). In some embodiments, the modeling engine 12 calculates the respective centroid of each region by weighting the horizontal and vertical coordinates in the region with the luminance values associated with those coordinates in accordance with equations (3) and (4).

$$x_{region-centroid} = 100 \cdot \frac{\sum_i x_i \cdot L_i}{D_{image-H} \cdot \sum_i L_i} \quad (3)$$

$$y_{region-centroid} = 100 \cdot \frac{\sum_i y_i \cdot L_i}{D_{image-V} \cdot \sum_i L_i} \quad (4)$$

In equations (3) and (4), $x_i$ and $y_i$ are the x-coordinate and the y-coordinate of image forming element i in the region, $D_{image-H}$ and $D_{image-V}$ are the image's horizontal and vertical dimensions, and $L_i$ is the luminance value of image forming element i. In accordance with equations (3) and (4), the modeling calculates the respective centroid of each region as a percentage of the image's horizontal and vertical dimensions. In some exemplary embodiments, the patch size of a region is a count of the number of image forming elements in the region.

Figure 12:
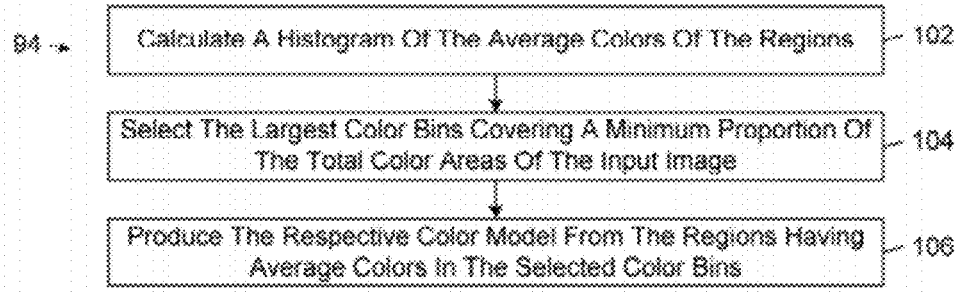
FIG. 12 is a flow diagram of an embodiment of a method producing a respective color model for an image from the respective modeled regions of a background sub-image.

FIG. 12 shows an embodiment of a method by which the modeling engine 12 produces a respective color model from the respective regions that are modeled in the input image (FIG. 10, block 94). In accordance with this method, the modeling engine 12 calculates a histogram of the average colors of the regions (FIG. 12, block 102). The modeling engine 12 selects the largest color bins covering a minimum proportion (e.g., 90%) of the total color areas (i.e., non-gray areas) of the input image (FIG. 12, block 104). The modeling engine 12 produces the respective color model from the regions having average colors in the selected color bins (FIG. 12, block 106).

Figure 13A:
FIG. 13A shows a segmented image that was produced from an exemplary image in accordance with the color segmentation process of FIG. 9.
Figure 13B:
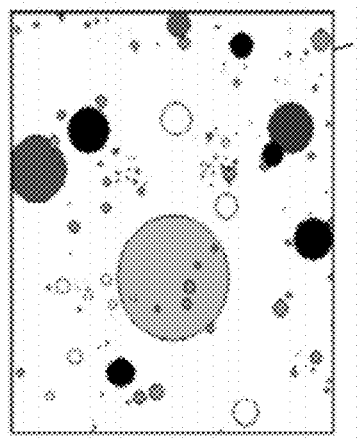
FIG. 13B shows a representation of a color model that was produced from the segmented image of FIG. 13A in accordance with the method of FIG. 10.

FIG. 13A shows a segmented image 110 that was produced from an exemplary image in accordance with the color segmentation process described above in connection with FIG. 9. FIG. 13B shows a representation of a color model 112 that was produced from the segmented image 110 in accordance with the method of FIG. 10. In FIG. 13B, the regions are modeled by circles having centers that coincide with the centroids of the corresponding regions in the segmented image 110 and having areas that encompass a number of image forming elements corresponding to the patch sizes of the corresponding regions.

Additional details regarding the operation and various implementations of the color modeling methods of FIGS. 10-12 are described in Pere Obrador, "Automatic color scheme picker for document templates based on image analysis and dual problem," in Proc. SPIE, vol. 6076, San Jose, Calif. (January 2006).

V. Retrieving Image Content

A. Overview

As explained above, the background color driven content retrieval system 10 retrieves at least one of the images 20 from a database based on a respective score that is calculated for each of the images from the image query and the respective color model (see FIG. 2, blocks 26 and 28). In this process, the search engine 14 compares the image query to the indices 18 and returns to the user interface 16 ones of the indices 18 that are determined to match the image queries. The search engine 14 ranks the indices 18 based on a scoring function that produces values indicative of the level of match between the image query and the respective indices 18, which define the respective models of visual weight in the images 20.

B. Generating an Image Query

The background color driven content retrieval system 10 may receive from the user interface 16 a direct specification by the user 22 of the target color template for the images to be retrieved by the system 10. Alternatively, the background color driven content retrieval system 10 may infer the target color template automatically from an analysis of a document being constructed by the user. In both of these cases, the color template may be derived from a user-specified target image or target document using any of the background color modeling methods described herein (see, e.g., FIGS. 3 and 10-13).

C. Determining a Respective Color Comparison Value for each Image

In some embodiments, the search engine 14 determines an image-based color comparison function (ColorScore$_i$) for each image i in the collection of the images 20. The color comparison function is based on a region-based color comparison function that compares each of the regions u in the target color template with each of the regions v in the background sub-image color model determined for each of the images 20. In some embodiments, the color comparison function decreases with increasing spatial distance between the regions in the target color template and the regions in the background sub-image color model, decreases with increasing Euclidean distance between the regions in the target color template and the regions in the background sub-image color model in a color space (typically the CIE Lab color space), and increases with the sizes of the target template regions and the background sub-image color model regions. Equation (5) defines an exemplary region-based color comparison function of this type:

$$ColorComp_{uv,i} = \frac{s(Size_u, Size_v)}{a(\Delta_{centroid,uv}) \cdot b(\Delta_{color,uv})} \qquad (5)$$

In equation (5), s( ) is a function of the size (Size$_u$) of the target color template region u and the size (Size$_v$) of the image color model region v of image i, a( ) is a function of $\Delta_{centroid,uv}$, which measures the spatial distance between the centroid of the target color template region u and the centroid of the image color model region v, and b( ) is a function of $\Delta_{color,uv}$, which measures the Euclidean color space distance between the centroid of the target color template region u and the centroid of the image color model region v of image i. In some embodiments, $\Delta_{centroid,uv}$ is calculated in accordance with equation (6):

$$\Delta_{centroid,uv} = \sqrt{(centroidX_u - centroidX_v)^2 + (centroidY_u - centroidY_v)^2} \qquad (6)$$

where (centroidX$_u$,centroidY$_v$) is the centroid location of the target color template region u and (centroidX$_u$,centroidY$_v$) is the centroid location of the image color model region v. For image queries that are designed to retrieve images that the user intends to insert into a document, $\Delta_{centroid,uv}$ measures the spatial distance between the target color template region u and the background sub-image color model region v for the candidate image positioned in a designated target location in the document. In some embodiments, $\Delta_{color,uv}$ is calculated in accordance with equation (7):

$$\Delta_{color,uv} = \sqrt{(aveL_u - aveL_v)^2 + (aveA_u - aveA_v)^2 + (aveB_u - aveB_v)^2} \qquad (7)$$

where (aveL$_u$,aveA$_u$,aveB$_u$) is the average L, a, and b color values of the target color template region u and (aveL$_v$,aveA$_v$,aveB$_v$) is the average L, a, and b color values of the image color model region v of image i.

In some of these embodiments, s( ) is given by equation (8), a( ) is given by equation (9), and b( ) is given by equation (10):

$$s(Size_u, Size_v) = (Size_u \times Size_v)^R \qquad (8)$$

$$a(\Delta_{centroid,uv}) = S + T \cdot (\Delta_{centroid,uv})^W \qquad (9)$$

$$b(\Delta_{color,uv}) = H + L \cdot (\Delta_{color,uv})^M \qquad (10)$$

where R, T, T, W, H, L, and M have empirically determined constant values. In one exemplary embodiment, R=0.5, S=T=W=H=L=1, and M=4.

In some embodiments, the image-based color comparison function (ColorScore$_{uv,i}$) is calculated from the region-based color comparison function (ColorComp$_{uv,i}$) for each image i in the collection of images 20 in accordance with equation (11):

$$ColorScore_i = \sum_{u \in document} \sum_{v \in image\ i} ColorComp_{uv,i} \quad (11)$$

D. Retrieving Images from a Database

The search engine 14 identifies one or more of the images 20 that have greatest likelihood of matching the image query based on the respective ImageScores$_i$ and retrieves the one or more identified images.

V. Exemplary Architecture of the Compositional Balance and Color Driven Content Retrieval System Embodiments of the background color driven content retrieval system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the background color driven content retrieval system 10, as well as the data is generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the background color driven content retrieval system 10 may be implemented in any one of a wide variety of electronic devices, including desktop computers, workstation computers, and server computers.

Figure 14:
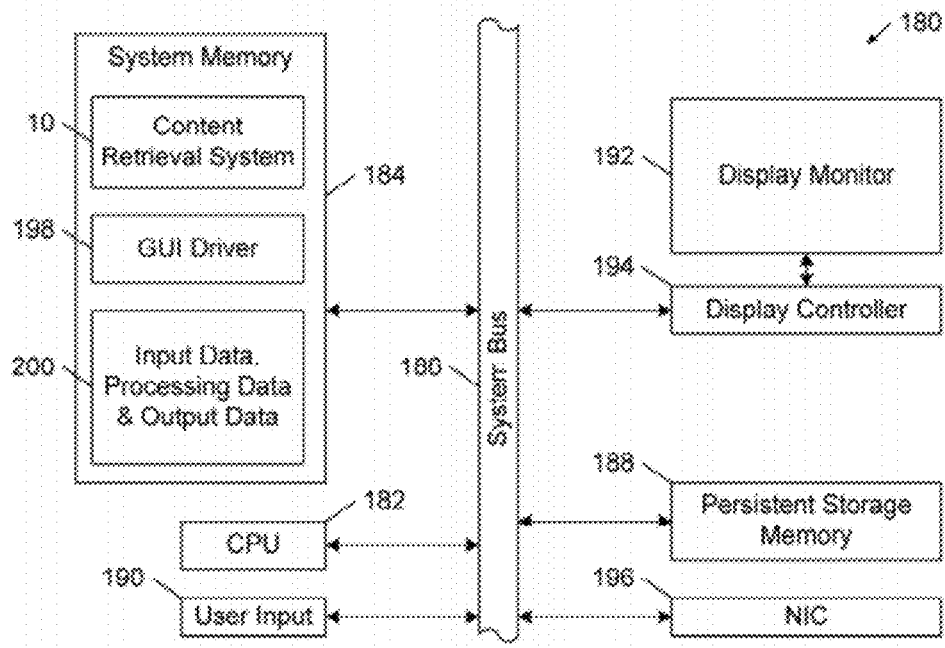
FIG. 14 is a block diagram of an embodiment of a computer system that implements an embodiment of the background color driven content retrieval system of FIG. 1.

FIG. 14 shows an embodiment of a computer system 180 that can implement any of the embodiments of the background color driven content retrieval system 10 that are described herein. The computer system 180 includes a processing unit 182 (CPU), a system memory 184, and a system bus 186 that couples processing unit 182 to the various components of the computer system 180. The processing unit 182 typically includes one or more processors, each of which may be in the form of any one of various commercially available processors. The system memory 184 typically includes a read only memory (ROM) that stores a basic input/output system (BIOS) that contains start-up routines for the computer system 180 and a random access memory (RAM). The system bus 186 may be a memory bus, a peripheral bus or a local bus, and may be compatible with any of a variety of bus protocols, including PCI, VESA, Microchannel, ISA, and EISA. The computer system 180 also includes a persistent storage memory 188 (e.g., a hard drive, a floppy drive, a CD ROM drive, magnetic tape drives, flash memory devices, and digital video disks) that is connected to the system bus 186 and contains one or more computer-readable media disks that provide non-volatile or persistent storage for data, data structures and computer-executable instructions.

A user may interact (e.g., enter commands or data) with the computer 180 using one or more input devices 190 (e.g., a keyboard, a computer mouse, a microphone, joystick, and touch pad). Information may be presented through a graphical user interface (GUI) that is displayed to the user on a display monitor 192, which is controlled by a display controller 194. The computer system 180 also typically includes peripheral output devices, such as speakers and a printer. One or more remote computers may be connected to the computer system 180 through a network interface card (NIC) 196.

As shown in FIG. 14, the system memory 184 also stores the background color driven content retrieval system 10, a GUI driver 198, and at least one database 200 containing input data, processing data, and output data. In some embodiments, the compositional balance and color driven content retrieval system 10 interfaces with the GUI driver 198 and the user input 190 to present a user interface for managing and controlling the operation of the background color driven content retrieval system 10.

VI. Conclusion

The embodiments that are described in detail herein are capable of retrieving images (e.g., digital photographs, video frames, scanned documents, and other image-based graphic objects including mixed content objects) based on background image color criteria. In some of these embodiments, images are indexed in accordance with models of their respective distributions of background color. Images are retrieved based on comparisons of their associated color based indices with the parameters of the background color driven image queries. These embodiments enable the retrieval of images captured at similar events and locations with reduced sensitivity to changes in the colors and the color distributions of transient foreground objects, thereby improving the retrieval results.

Other embodiments are within the scope of the claims.

What is claimed is:

1. A method, comprising by a computer:
   determining a respective model of background color for each image in a set of images, wherein the determining comprises for each image in the set of images extracting a respective background sub-image from the image, segmenting the background sub-image into regions, and labeling each of the regions with a respective color label, wherein the determining additionally comprises for each image in the set of images: calculating a respective centroid and a respective size for ones of the labeled regions; and building the respective color model from the calculated centroids and the calculated sizes;
   generating an image query from a target color template;
   calculating for each image in the set of images a respective score from the image query and the respective color model for the image; and
   retrieving at least one of the images from an image collection based on the respective scores.

2. The method of claim 1, wherein the calculating comprises for each image in the set of images: calculating the respective score from a respective color comparison value that compares the target color template and the respective color model of the image.

3. The method of claim 2, wherein the calculating comprises for each image in the set of images: calculating the respective color comparison value from a measure of distance between the target color template and the respective color model of the image.

4. The method of claim 2, wherein the retrieving comprises identifying one or more of the images in the set of images having greatest likelihood of matching the image query based on the respective scores and retrieving the one or more identified images.

5. The method of claim 1, wherein for each image in the set of images the determining comprises determining a respective foreground object region, and the extracting comprises extracting the respective background sub-image from regions of the image outside each of the foreground object regions.

6. The method of claim 5, wherein for each image in the set of images the determining comprises detecting one or more face regions each of which contains at least a portion of a face appearing in the image, and deriving one or more of the foreground object regions from respective ones of the detected face regions.

7. The method of claim 6, wherein for each image in the set of images the determining comprises deriving a respective head region from each of the detected face regions, and deriving one or more of the foreground object regions from respective ones of the head regions.

8. The method of claim 6, wherein for each image in the set of images the determining comprises determining for each of the head regions ascertained in the image a respective body region containing at least a portion of a body associated with the respective head region, and deriving one or more of the foreground object regions from respective ones of the body regions.

9. The method of claim 5, wherein for each image in the set of images the determining comprises ascertaining in-focus regions of the image and deriving each of the foreground object regions from a respective one of the in-focus regions.

10. Apparatus, comprising:
a memory; and
a processing unit coupled to the memory and operable to perform operations comprising:
determining a respective model of background color for each image in a set of images, wherein the determining comprises for each image in the set of images extracting a respective background sub-image from the image, segmenting the background sub-image into regions, and labeling each of the regions with a respective color label, wherein in the determining the processing unit is operable to perform for each image in the set of images operations comprising: calculating a respective centroid and a respective size for ones of the labeled regions; and building the respective color model from the calculated centroids and the calculated sizes;
generating an image query from a target color template;
calculating for each image in the set of images a respective score from the image query and the respective color model for the image; and
retrieving at least one of the images from an image collection based on the respective scores.

11. The apparatus of claim 10, wherein in the calculating the processing unit is operable to perform operations comprising: calculating the respective score for each image in the set of images from a respective color comparison value that compares the target color template and the respective color model of the image.

12. The apparatus of claim 11, wherein in the calculating the processing unit is operable to perform operations comprising: calculating the respective color comparison value for each image in the set of images from a measure of distance between the target color template and the respective color model of the image.

13. The apparatus of claim 11, wherein in the retrieving the processing unit is operable to perform operations comprising: identifying one or more of the images in the set of images having greatest likelihood of matching the image query based on the respective scores and retrieving the one or more identified images.

14. The apparatus of claim 10, wherein in the determining the processing unit is operable to perform operations comprising: determining a respective foreground object region for each image in the set of images, and in the extracting the processing unit is operable to perform operations comprising extracting the respective background sub-image from regions of the image outside each of the foreground object regions.

15. The apparatus of claim 14, wherein in the determining the processing unit is operable to perform operations comprising: detecting in each image in the set of images one or more face regions each of which contains at least a portion of a face appearing in the image, and deriving one or more of the foreground object regions from respective ones of the detected face regions.

16. The apparatus of claim 15, wherein in the determining the processing unit is operable to perform operations comprising: deriving a respective head region from each of the detected face regions, and deriving one or more of the foreground object regions from respective ones of the head regions.

17. The apparatus of claim 15, wherein in the determining the processing unit is operable to perform operations comprising: determining for each of the head regions ascertained in the image a respective body region containing at least a portion of a body associated with the respective head region, and deriving one or more of the foreground object regions from respective ones of the body regions.

18. The apparatus of claim 14, wherein in the determining the processing unit is operable to perform for each image in the set of images operations comprising: ascertaining in-focus regions of the image and deriving each of the foreground object regions from a respective one of the in-focus regions.

19. A non-transitory computer readable medium storing computer-readable instructions causing a computer to perform operations comprising:
determining a respective model of background color for each image in a set of images, wherein the determining comprises for each image in the set of images extracting a respective background sub-image from the image, segmenting the background sub-image into regions, and labeling each of the regions with a respective color label, wherein the determining additionally comprises for each image in the set of images: calculating a respective centroid and a respective size for ones of the labeled regions; and building the respective color model from the calculated centroids and the calculated sizes;
generating an image query from a target color template;
calculating for each image in the set of images a respective score from the image query and the respective color model for the image; and
retrieving at least one of the images from an image collection based on the respective scores.

* * * * *